United States Patent
Ingram et al.

(10) Patent No.: US 11,410,099 B2
(45) Date of Patent: Aug. 9, 2022

(54) FLEXIBLE ROUTING OF OUTBOUND CONTACT REQUESTS

(71) Applicant: SINCH GERMANY GMBH, Munich (DE)

(72) Inventors: Jonathan Ingram, Vantaa (FI); Vladimir Tikhomirov, Helsinki (FI); Inna Repo, Espoo (FI); Harri Pesonen, Espoo (FI)

(73) Assignee: SINCH GERMANY GMBH, Munich (DE)

( * ) Notice: Subject to any disclaimer, the term of this patent is extended or adjusted under 35 U.S.C. 154(b) by 0 days.

(21) Appl. No.: 16/922,650

(22) Filed: Jul. 7, 2020

(65) Prior Publication Data

US 2022/0012670 A1    Jan. 13, 2022

(51) Int. Cl.
| G06F 15/16 | (2006.01) |
| G06Q 10/06 | (2012.01) |
| G06Q 10/10 | (2012.01) |
| G06Q 50/00 | (2012.01) |
| H04L 51/04 | (2022.01) |
| H04L 67/306 | (2022.01) |

(52) U.S. Cl.
CPC ... *G06Q 10/063112* (2013.01); *G06Q 10/107* (2013.01); *G06Q 50/01* (2013.01); *H04L 51/04* (2013.01); *H04L 67/306* (2013.01)

(58) Field of Classification Search
CPC ............. H04L 29/06027; H04L 51/046; H04L 67/141; H04M 3/523; H04M 3/5183; H04M 7/006; H04M 3/5175
USPC ............................... 709/227, 228; 705/7.14
See application file for complete search history.

(56) References Cited

U.S. PATENT DOCUMENTS

| 2014/0098949 | A1* | 4/2014 | Williams | ............... G06Q 10/02 379/265.09 |
| 2016/0034260 | A1* | 2/2016 | Ristock | ..................... G06F 8/36 717/109 |
| 2016/0119477 | A1* | 4/2016 | Sharpe | ................ H04M 3/5233 379/265.09 |

OTHER PUBLICATIONS

CISCO, "Outbound Option", Packaged CCE Optional Features Guide for Release 9.0(x), 62 pages.

(Continued)

*Primary Examiner* — Wing F Chan
*Assistant Examiner* — Andrew Woo
(74) *Attorney, Agent, or Firm* — K&L Gates LLP

(57) ABSTRACT

Systems, methods, and computer media for routing outbound contact requests are provided herein. The described examples allow routing and execution of outbound contact requests of different types, such as voice call, voice message, text message, chat, and email. Routing rules govern the routing of scheduled, automatic, and push-delayed outbound contact requests based on the type of outbound contact request and parameters associated with the request. Routing can include, for example, queuing a request for an agent, scheduling a request for release at a specified time, reserving a request for delayed push, or automatically executing an outbound contact event corresponding to the request.

19 Claims, 6 Drawing Sheets

(56) References Cited

OTHER PUBLICATIONS

"SAP Contact Center 365 Delivers Enhanced Customer Service," *SAP News*, Oct. 8, 2019, downloaded from https://news.sap.com/2019/10/saD-contact-center-365-enhanced-customer-service/ on Jul. 6, 2020, pp. 1-6.
"Engage Customers Anytime,Through Any Channel," *SAP Solution Brief, SAP Digital Interconnect, SAP Contact Center 365*, 8 pages, 2019, downloaded from https://community.sapdigitalinterconnect.com/sybase/attachments/sybase/SAPContactCenter365/1/1/SAP%20Contact%20Center%20365%20Solution%20Brief.pdf.
BİRLESCU; International Search Report and Written Opinion of PCT/EP2021/067404; dated Sep. 30, 2021; 10 pgs.

\* cited by examiner

FLEXIBLE ROUTING OF OUTBOUND CONTACT REQUESTS

BACKGROUND

As communication becomes increasingly software and internet based, managing communications of different types on a large scale has become increasingly difficult. Conventionally, contact campaigns for outreach to a large group involves manually making telephone calls or emails to the individuals in the group. Systems designed for such use can be both inefficient and unable to handle other forms of communication.

DETAILED DESCRIPTION

The examples described herein flexibly and automatically route outbound contact requests. An outbound contact request refers to a request submitted through a software application to outbound contact functionality to automatically initiate contact with devices, users, or individuals as part of, for example, a messaging campaign. The described approaches to routing outbound contact requests allow the outbound contact functionality to receive and route outbound contact requests of different types (e.g., requests specifying voice call, voice message, text message, social media message, chat, email, etc.) that require different handling. The flexibility of one implementation to efficiently handle multiple situations saves computing resources and simplifies interactions with external applications. Outbound contact functionality can be a standalone application or can be an extension, module, or service accessible by an external application.

As a specific example, a messaging campaign can be initiated to contact potentially interested parties about a product. In the messaging campaign, emails, texts, social media messages, or other communications can be sent to the potentially interested parties using outbound contact requests and outbound contact functionality. For example, a group of 1000 targets can be identified, and an outbound contact request can be generated for each target.

The outbound contact requests can include characteristics such as the contact type (e.g., whether to send the target a text, email, etc.), a campaign identifier, a scheduled release time, and other information. The outbound contact requests can be generated and imported through interaction between an external application (such as a call center application or marketing application) and an application programming interface (API) of the outbound contact functionality. In some examples, the outbound contact functionality can be integrated into an external application. Based on characteristics of the outbound contact requests (e.g., the request type, whether the request is scheduled, etc.), the outbound contact requests are routed and handled appropriately (e.g., automatically sent at the scheduled time). The outbound contact requests for a single campaign can have different types (i.e., some parties are to be contacted by text, some by email, etc.), and, unlike conventional approaches, the outbound contact functionality is able to route and handle the requests as appropriate. Additional examples are described below with reference to FIGS. 1-6.

Figure 1:
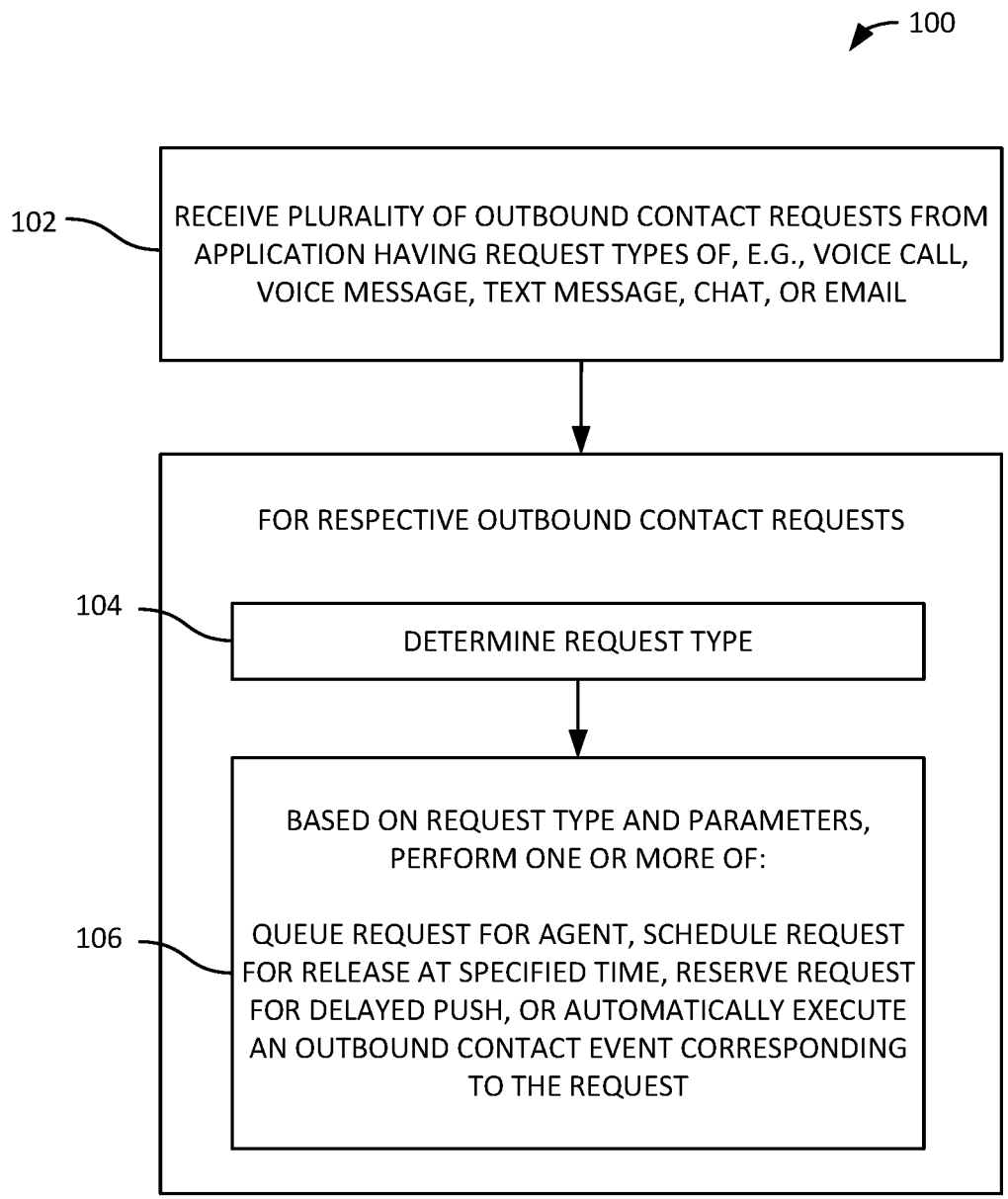
FIG. 1 illustrates an example method of routing outbound contact requests.

FIG. 1 illustrates a method 100 of routing outbound contact requests. An outbound contact request refers to a request submitted through a software application to outbound contact functionality to automatically initiate contact with devices, users, or individuals. Outbound contact requests can be, for example, part of a large-scale campaign to contact a large number of devices or individuals, such as a survey, product introduction, or advertising campaign. Outbound contact requests can have different types reflecting the contact to be made (e.g., voice call, voice message, text message, chat, social media message, email, etc.). Generation of outbound contact requests can be done through, for example, the interaction of an external application with an API of the outbound contact functionality.

In process block 102, a plurality of outbound contact requests are received from an application. The outbound contact requests can be received (e.g., imported) by, for example, the same API through which they are created. Outbound contact requests can contain a variety of information about the contact to be made, including an email address/phone number to be contacted, a scheduling time for the contact to be made, an indication of whether involvement of an agent (e.g., human or AI) is indicated, a campaign ID, etc.

An example outbound contact request is represented below in Table 1.

TABLE 1

Example Outbound Contact Request

```
[
+55
"name":                 "JohnDoe",
"address":              "+15035782121",
"campaignID":           "777",
"campaignName":         "OfferForNewMedicalEquipment",
"fromAddressDiplay":    "MedicalService",
"fromAddress":          "+18002227942",
"agentRequired":        1,
"channel":              1,
"maxRetryCount":        4,
"scheduledTime":        "2020-07-18T10:52:17.7GMT",
"busyDelaySeconds":     "120",
"noAnswerDelaySeconds": "1200",
"failureDelaySeconds":  "60",
"previewMode":          0
},
// next customer
{
...
},
]
```

The outbound contact request shown in Table 1 is a request to call (the "channel" field=1, indicating a voice call) a single customer, shown as "John.Doe" in the "name" field, at the phone number shown in the "address field." The outbound contact request shown in Table 1 is part of a campaign having a campaign ID "777." In some examples, an outbound contact request is generated for each individual/device being contacted, as shown in Table 1. Table 2, below, provides an explanation for each of the fields (also referred to herein as "parameters") shown in Table 1.

TABLE 2

Field Definitions for Outbound Contact Request of Table 1

| FIELD | DEFINITION |
| --- | --- |
| name | customer name |
| address | Customer address (email, phone number) |
| campaignID | Identifier for the campaign the request is part of |
| campaignName | Name of campaign the request is part of |
| fromAddress | Address of initiator of the contact (e.g., a company making an offer) |
| fromAddressDisplay | Address of the initiator shown for the customer |
| agentRequired | Flag indicating whether agent handling is needed for the contact (e.g., 0 = no, 1 = yes) |
| channel | Request type (email, chat, call, social media, etc.) Can be defined as text or numeral (e.g., 1 = voice call) |
| maxRetryCount | Maximum retry attempts (e.g., how many more times to call if customer not reached) |
| scheduledTime | Time for contact to be made - initially set through external application via API, recalculated if needed for retry contact attempts |
| busyDelaySeconds | Retry delay time after busy signal encountered. |
| noAnswerDelaySeconds | Retry delay time after no answer to call. |
| previewMode | Whether a preview is available to human agents: 0 = no preview; 1 = previewTime is configured; 2 = unlimited preview |

The number and types of fields in an outbound contact request can vary depending upon the request type. For example, the request shown in Tables 1 and 2 has a request type of voice call ("channel"=1), so "busyDelaySeconds," specifying how long to wait before a retry if a busy signal is encountered, and "noAnswerDelaySeconds," specifying how long to wait before a retry if there is no answer, are relevant information and are included in the request. For an outbound contact request having a type of email, these fields can be excluded, left blank, set to 0, or otherwise ignored.

Although Tables 1 and 2 show a number of fields, some examples include fewer or more fields. In some examples, the outbound contact request can reference a customer list or group which can be accessed by the outbound contact functionality, and new outbound contact requests can then be generated for each member of the group, carrying over the other parameters listed in the original request.

The message portion of an outbound contact request (e.g., the actual email attachment, text, or SMS text that will be sent or script to read over the phone) can be received as a separate communication sent by the external application that is interacting with the outbound contact functionality. The separate communication can, for example, include the same value for the "name" and/or "campaignID" as the outbound contact request so that the message or attachment can be added before execution. This allows, for example, an email attachment to be received and stored once for a user or campaign and added to the email before it is sent. In some examples, the outbound contact request can contain the message.

In process block 102, a first subset of the received outbound contact requests have a first request type, and a second subset of the received outbound contact requests have a second request type different from the first request type. Available request types include voice call, voice message, text message, social media message, chat, or email.

Process blocks 104 and 106 are performed for the respective outbound contact requests. In process block 104, the request type is determined. The request type can be specified as a parameter or metadata in the request (e.g., the "channel" field in the request shown in Table 1). In some examples, a request type is not expressly specified in the request but can be inferred from other information. For example, if an email address is included as the contact information, the request type can be inferred to be email. Similarly, if a phone number is included as the contact information, and retry information is included for no answer/busy signal, a voice call can be inferred. The outbound contact request functionality can handle both the first and second subsets of received requests even though they are of different types.

The request type of a particular request can be set by the external application that created the outbound contact request. The chosen request type can vary depending on the type of campaign, message being conveyed, demographic characteristics of target customers, etc. A customer database can also indicate customer preferences, such as do not call, text preferred, do not contact after 8 pm, etc., and these preferences can be considered when determining which type of outbound contact request to generate for a particular customer.

In some examples, multiple request types, and corresponding contact information for each, can be specified. Such an arrangement allows a campaign to both call and email a customer, for example, and also provides an alternative channel if, for example, an undeliverable reply is received or a busy signal encountered. In other examples, if different types of contacts are desired for the same customer, separate outbound contact requests are generated for each.

In process block 106, based on the request type and one or more parameters (e.g., if an agent is indicated, if a scheduled time is indicated, etc.), one or more actions are performed. The actions can include queuing the outbound contact request for an agent, scheduling the outbound contact request for release at a specified time, reserving the outbound contact request for delayed push, or automatically executing an outbound contact event corresponding to the outbound contact request. An outbound contact event is the actual sending of a message (or plurality of messages) or making of a call to a user's device(s), where the method of transmission is determined by the request type. For an outbound contact request of type email, for example, sending the email is the contact event. As used herein, an agent refers to a virtual, artificial-intelligence-based agent or a human agent that can execute an outbound contact event based on the request. For example, agents can be used to make voice calls.

Figure 2:
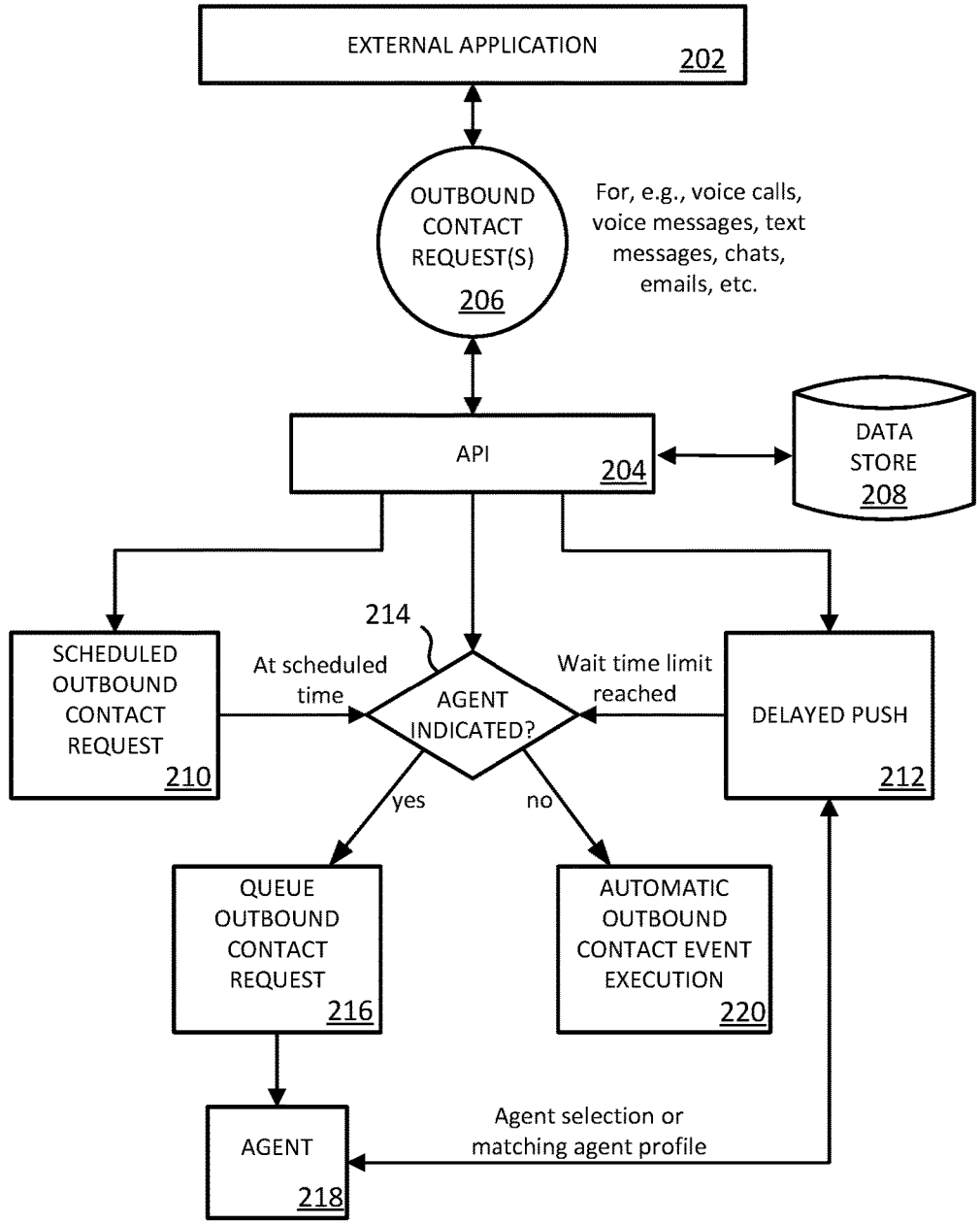
FIG. 2 illustrates an example flow for routing outbound contact requests of different types.

FIG. 2 is a flow chart 200 illustrating some of the actions of process block 106 of FIG. 1. External application 202 (e.g., a call center, marketing, or other application) communicates with API 204 to create one or more outbound contact requests 206. Outbound contact requests 206 can have a request type of, for example, voice call, voice message, text message, social media message, chat, email, etc. Outbound requests 206 can be, for example, part of a contact campaign where a separate request is generated for each target customer, and the respective requests can have a common campaign ID (along with other parameters). Outbound contact requests 206 are received through API 204. Data store 208 (e.g., a database) is configured to store contact request information for potential targets. Application 202 can access contact information for potential targets from data store 208 through API 204 for use in generating outbound contact requests 206 using API 204.

Contact request information can include, for example, campaign data, address, phone number, email address, customer name, retry count limit, scheduled time, time zone, customer contact preferences, etc. Contact request information is used for specifying the customer and logic for handling a contact request. The example outbound contact request shown in Table 1 illustrates contact request information represented by the various fields and corresponding values.

Outbound contact requests can be "scheduled," meaning they are scheduled to be executed or sent to an agent at a set time. Whether the request is scheduled, along with a scheduled time, can be specified in the request. All request types can be scheduled, but some request types, such as voice calls or text messages, can be inferred as being scheduled given that calls executed during the middle of the night, for example, are unlikely to be successful or well received. Other request types, such as emails, can be executed immediately rather than being scheduled.

If an outbound contact request is a "delayed push" request, it is routed to delayed push requests 212. A delayed push request is a request that is reserved for agents to select until a maximum wait time has been reached. Thus, the request is queued and is pushed to an agent upon request rather than being scheduled for a particular time. The request remains in the queue until the maximum wait time has been reached, at which point it can be assigned to an available agent. Requests can be specified as delayed push in, for example, situations where a particular expertise or experience is desired in an agent (e.g., having particular language skills, technical expertise, or authority). As an example, if an outbound contact request specifies a phone call to a customer who is a Finnish speaker, then delayed push can be indicated in the request so that the request can be queued for agents having skill with the Finnish language, who can then make the call when they are available.

For scheduled outbound contact requests, when the scheduled release time is reached (e.g., specified by a scheduling parameter), it is determined in decision block 214 whether an agent is indicated. For some scheduled requests, such as a voice call, execution by an agent might be preferred. For other scheduled requests, such as email or text requests, agent involvement is less important or unnecessary, but it still may be desirable to schedule execution (e.g., sending text messages or emails at a time when they are most likely to be responded to, such as between 8-10 am). If an agent is indicated, the outbound contact request is queued in block 216 for agent 218. If an agent is not indicated, an outbound contact event is automatically executed in block 220. An outbound contact event corresponds to the type of outbound contact request. For example, sending an email is an example of an outbound contact event for an email request type.

Similar to scheduled requests, when the wait time limit for a delayed push request is reached, it is determined in decision block 214 whether an agent is indicated. If yes, then the request is queued in block 216 for execution by agent 218. If no, then an outbound contact event can be automatically executed.

As a specific example, if outbound contact request 206 has a request type of text message and a time condition is satisfied, a corresponding outbound contact event can be automatically executed. The time condition can be, for example, a scheduled time based on a scheduling parameter or a time range of acceptable execution times, such as between 8 am and 9 pm.

In another example, upon determining that outbound contact request 206 includes a scheduling parameter, outbound contact request 206 is scheduled for release at a time specified by the scheduling parameter in block 210. Upon determining that agent handling is not indicated for the outbound contact request in block 214, an outbound contact event is executed at the time specified by the scheduling parameter. Upon determining that agent handling is indicated for the outbound contact request, the outbound contact request is queued for an agent in block 216. Agent 218 can be selected from a group of available agents based on one or more agent parameters, such as an agent skill (e.g., language or technology ability), a current wait time, or agent authority level.

In some examples, agent 218 is provided a preview before execution of an outbound contact event. Agent 218 can also skip execution of individual events, causing the corresponding request to return to the queue, or determine not to execute the event. After execution or decision not to execute, outbound contact requests/corresponding outbound contact events can be manually or automatically classified as, for example, successful or unsuccessful.

In some examples, classification can also include options such as reschedule, wrong person, modem, unknown, etc. Depending upon the classification, new contact events can be generated for the same contact request (e.g. until a retry limit is reached). Example classifications are shown below in Table 3.

TABLE 3

Example Classifications

| CLASSIFICATION | DESCRIPTION |
| --- | --- |
| Success | Transaction with customer was successful. Default option. |
| Refusal | Customer not interested. Do not try again. |
| HangUp | Customer hung up. Do not try again. |
| Busy | Phone busy. Retries in set time until retries limit met. |
| NoAnswer | No answer. Redials in set time until retries limit met. |
| Immediate | Immediate automatic next attempt (in case of call drop for unknown reason). Ignore retries limit. |
| Reschedule | Agent sets a new date/time for retry. |
| WrongPerson | Incorrect person contacted. Do not try again. |
| WrongAddress | Incorrect contact number/address. Do not try again. |
| Modem | Modem/fax number. Do not try again. |
| TemporaryFailure | System failed to execute contact. Retries in set time. |
| Unknown | Failure to classify contact (i.e., UI crashed). Retries in set time. |
| SystemError | System failed to execute contact. No retry. |
| MaxRetries | Retry limit reached. |

In examples in which the outbound request type is email and the email includes an attachment, one copy of the attachment can be stored in memory, and for each outbound contact event executed (email sent), the attachment can be added before execution. Storing only one copy of an attachment saves significant computing resources compared to storing the complete email for each recipient.

In some examples, data store 208 can also store demographic information such as age, income, political affiliation, etc., region or language, contact history (e.g., how frequently the user has been contacted in the past, response statistics, etc.), and other information. A subset of the potential targets stored in data store 208 can be identified as targets by application 202 based on such information. In some examples, outbound contact request 206 is a single request specifying desired customer characteristics based on location, income, preferences, etc., potential targets are identified in data store 208 based on the characteristics, and individual outbound contact requests are then generated for the identified targets.

Figure 3:
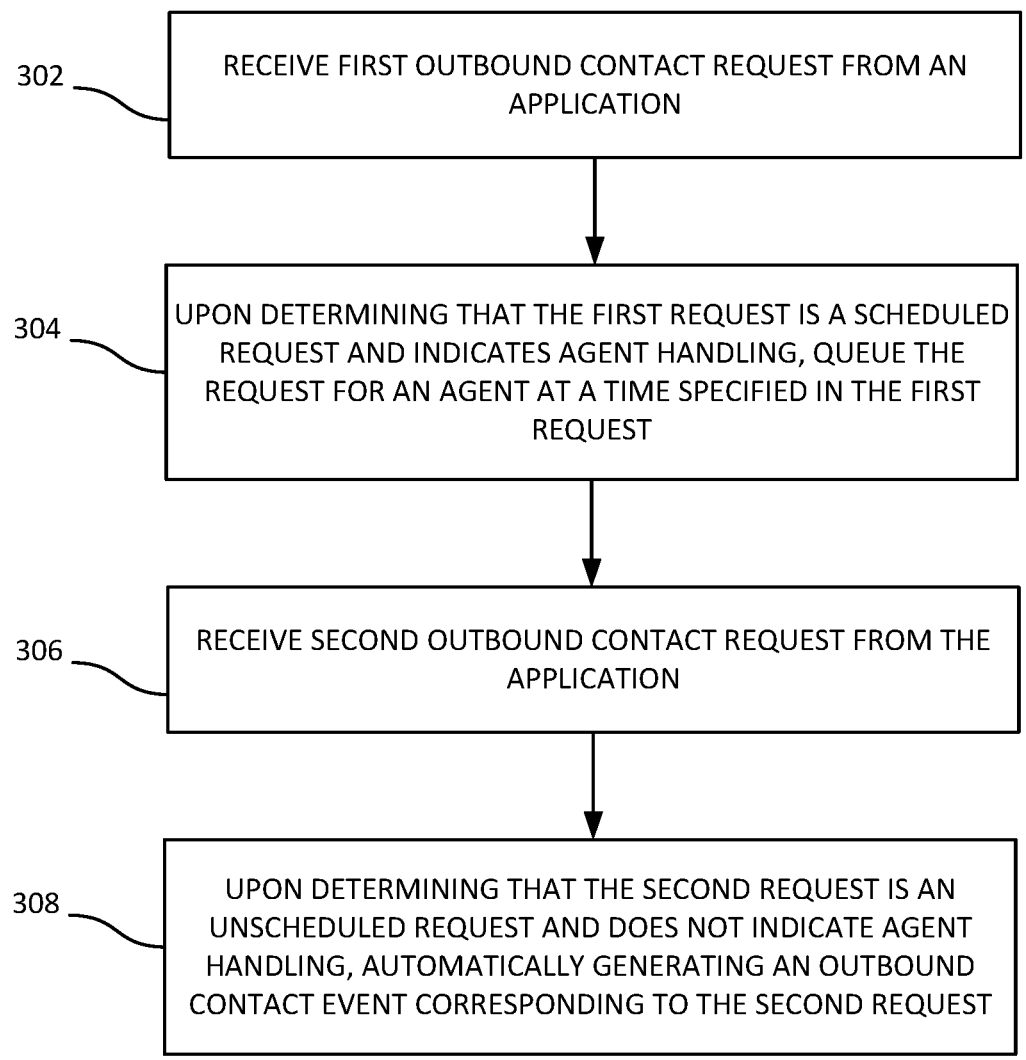
FIG. 3 illustrates an example method of routing outbound contact requests in which a request indicating agent handling and a request not indicating agent handling are received.

FIG. 3 illustrates a method 300 of routing outbound contact requests. In process block 302, a first outbound contact request is received from an application. Upon determining that the first outbound contact request is a scheduled request and indicates agent handling, the first outbound contact request can be queued in process block 304 for an agent at a time specified in the first outbound contact request. In process block 306, a second outbound contact request is received from the application. In process block 308, upon determining that the second outbound contact request is an unscheduled request and does not indicate agent handling, an outbound contact event corresponding to the second outbound contact request can be automatically executed. In some examples, method 300 also includes receiving a third outbound contact request from the application, and, upon determining that the third outbound contact request is a delayed push request and indicates agent handling, the third outbound contact request can be reserved until selection by an agent. The first, second, and third requests can all be received through the same API.

Figure 4:
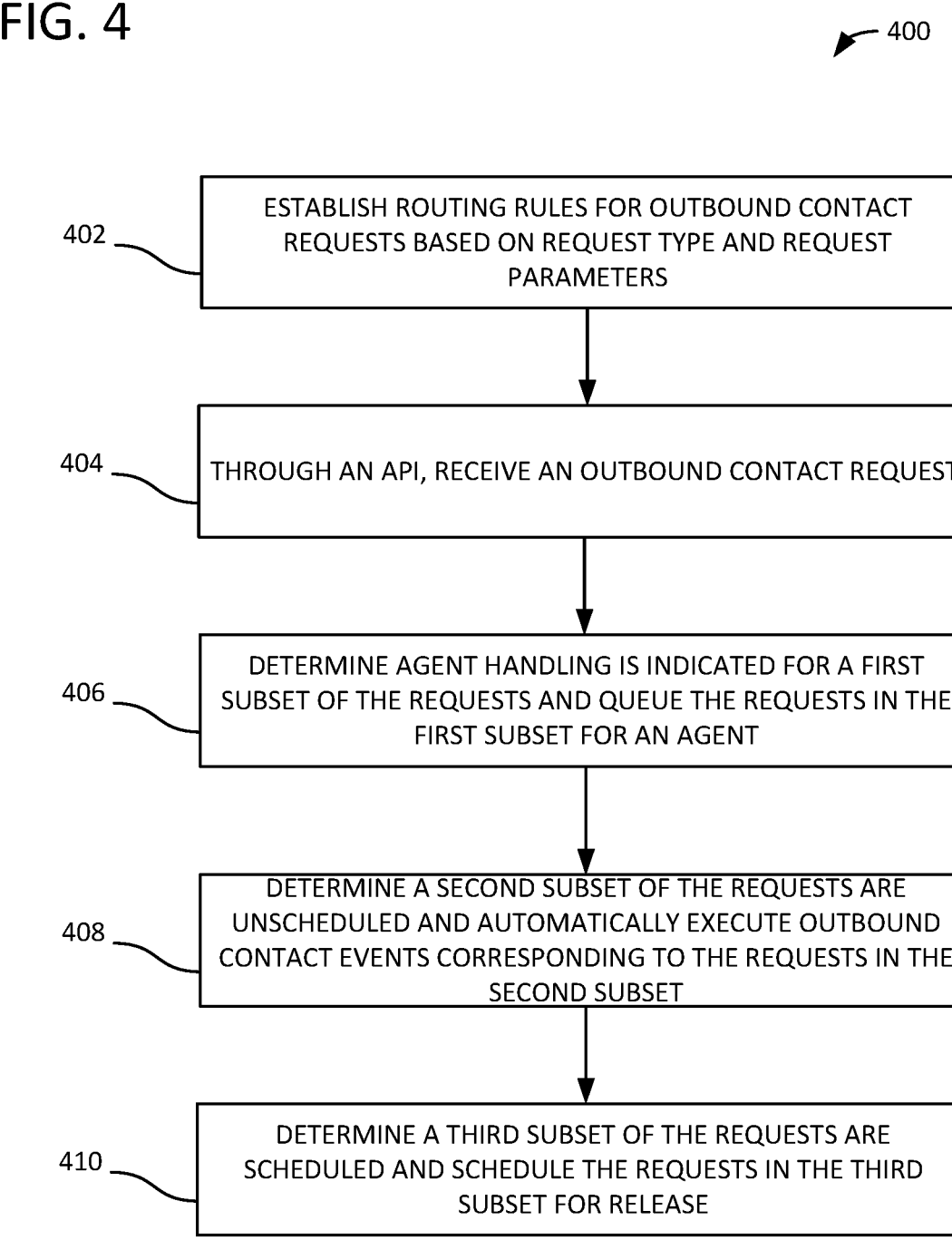
FIG. 4 illustrates an example method of routing outbound contact requests in which routing rules based on request type and request parameters are applied.

FIG. 4 illustrates a method 400 of routing outbound contact requests. In process block 402, routing rules are established for outbound contact requests based on a request type (e.g., voice call, email, text message, etc.) and one or more request parameters (e.g., agent indicated, scheduled/not scheduled, release time). The routing rules can reflect, for example, the flow illustrated in FIG. 2. Multiple different request types can be routed using the routing rules. In process block 404, a plurality of outbound contact requests is received through an API. The plurality of outbound contact requests can be generated by interaction of an external program with the API. In process block 406, it is determined that agent handling is indicated for a first subset of the plurality of outbound contact requests, and the respective requests in the first subset are queued for an agent. Agent handling can be indicated by a field as illustrated in Tables 1 and 2. Agent handling can also be determined based on the request type (e.g., a rule establishing that voice calls indicate agent handling).

In process block 408, it is determined that a second subset of the plurality of outbound contact requests are unscheduled, and outbound contact events corresponding to the requests in the second subset are automatically executed. For example, if a request of type email is determined to be unscheduled, an email can be automatically sent (the corresponding outbound contact event). In process block 410, it is determined that a third subset of the plurality of outbound contact requests are scheduled, and the respective requests of the third subset are scheduled for release at times specified in the respective requests.

In some examples, outbound contact requests are created for customers having a desired customer ready state. The customer ready state can be represented by an integer or other value. For example, a value of 0 can indicate the customer is not yet ready for processing (state "draft"), a value of 1 can indicate the customer is ready to receive an outbound contact event (state "ready"), a value of 2 can indicate that the customer is in the process of being rescheduled (state "reschedule"), a value of 3 can indicate that the customer is in a queue awaiting an agent or being handled by an agent (state "processing"), and a value of 4 can indicate that the customer has been handled and that additional attempts to contact the customer should not be made (state "handled"). Other ready state parameter values and meanings are also possible. Customer ready state can be updated as outbound contact requests are routed. Customer ready state can be stored as part of a data store accessed by an external application when outbound customer requests are created and/or stored and tracked in a manner locally accessible to the routing logic.

Figure 5:
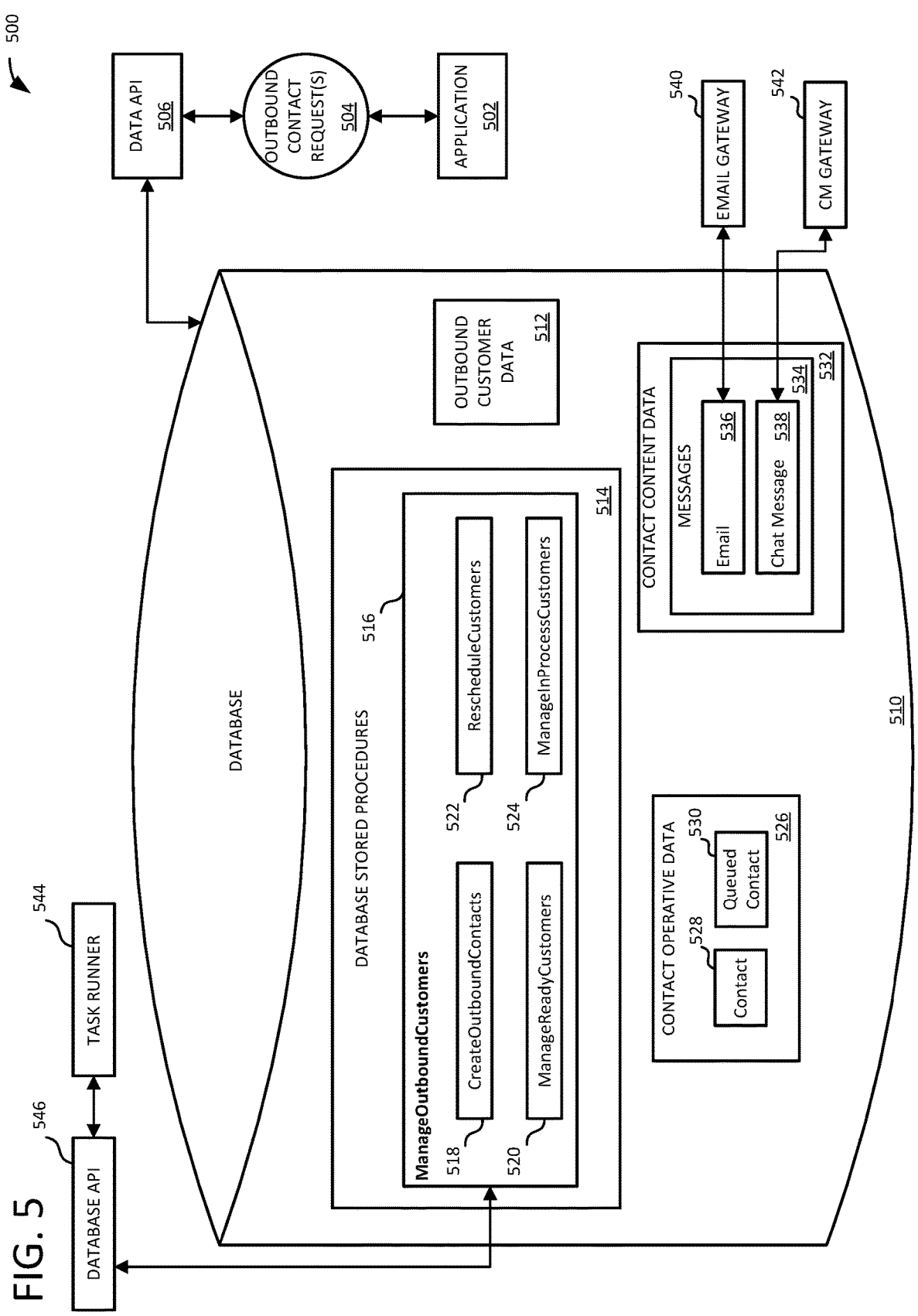
FIG. 5 illustrates outbound contact routing using procedures stored in a database.

FIG. 5 illustrates an example system 500 configured to route outbound contact requests. System 500 can carry out the methods illustrated in, e.g., FIGS. 1-4. An application 502 creates one or more outbound contact requests 504 by interacting with a data API 506. API 506 is configured to receive created outbound contact requests of different types such as voice call, voice message, text message, email, and chat. In some examples, API 506 communicates with database 510 through, for example, an OData service. In other examples, API 506 communicates directly with database 510. Database 510 can be a single or multi-tenant database and can be an in-memory, columnar, relational database. Database 510 stores outbound customer data 512 along with database stored procedures 514. Database stored procedures 514 includes a main stored procedure 516 "ManageOutboundCustomers," which contains procedures 518, 520, 522, and 524.

Procedure 518 is "CreateOutboundContacts," which creates outbound contact requests for customers having a customer state of "ready" (e.g., using the customer ready state classification example discussed with respect to FIG. 4) and updates links to related persistent objects. Procedure 518 can be accessed through data API 506 by application 502 to create outbound contacts. Procedure 520 is "ManageReadyCustomers," which reads outbound contact requests for customers in ready state and makes routing decisions for the requests.

Procedure 522 is "RescheduleCustomers," which processes customers in state "reschedule" and updates schedule time for the customers depending on a last classification or completes them if a maximum number of retries has been reached (and sets customer state to "handled"). Procedure 524 is "ManageInProcessCustomers," which processes customers having a state of "processing" with a request type of email or chat that does not indicate agent handling. If a corresponding outbound contact event (e.g., email or chat) has been executed, the contact request can be classified and then marked as complete.

Contact operative data 526 stores contacts 528 created by procedure 518 for ready customers and queued contacts 530 pushed to the queue by procedure 520. Contact content data 532 contains messages 534, such as emails 536 and chat messages 538 and other outbound contact types (not shown). Emails 536 can be sent via email gateway 540 and chat messages 538 can be sent by chat message gateway 542. Sent emails and chat messages are examples of outbound contact events. Contact content data 532 communicates with procedure 520 and data API 506. Task runner 544 communicates with database 510 through database API 546 and initiates main procedure 514.

Example Computing Systems

Figure 6:
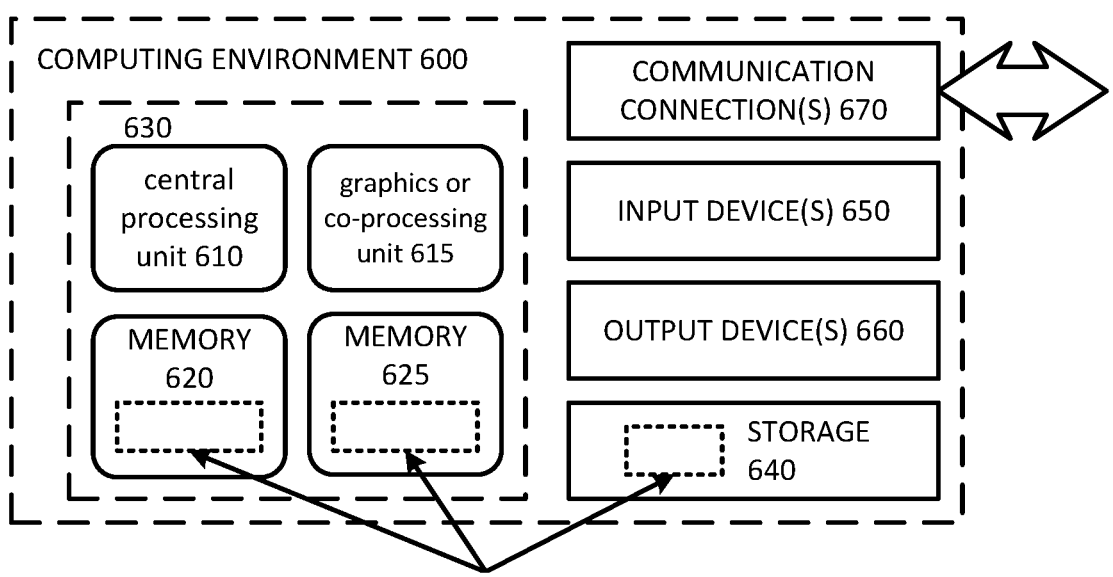
FIG. 6 is a diagram illustrating a generalized implementation environment in which some described examples can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, memory 620 and 625 can store database stored procedures 514 of FIG. 5.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein. For example, storage 640 can store database stored procedures 514 of FIG. 5.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of routing outbound contact requests, comprising:
    receiving a plurality of outbound contact requests from an application, wherein a first subset of the plurality of outbound contact requests has a first request type, and a second subset of the plurality of outbound contact requests has a second request type different from the first request type, wherein available request types include voice call, voice message, text message, social media message, chat, or email;
    for each of the respective outbound contact requests of the plurality of outbound contact requests:
        determining a request type of the outbound contact request; and
        based on the determined request type and one or more parameters, performing one or more of: queuing the outbound contact request for an agent, scheduling the outbound contact request for release at a specified time, reserving the outbound contact request for delayed push, or automatically executing an outbound contact event corresponding to the outbound contact request; and
    for at least one of the outbound contact requests of the plurality of outbound contact requests, upon determining that the at least one of the outbound contact requests is a delayed push request and indicates agent handling, reserving the at least one of the outbound contact requests until selection by an agent.

2. The method of claim 1, wherein upon determining that an outbound contact request of the plurality of outbound contact requests has a request type of text message and that a time condition is satisfied, a corresponding outbound contact event is automatically executed.

3. The method of claim 1, wherein upon determining that an outbound contact request includes a scheduling parameter, the outbound contact request is scheduled for release at a time specified by the scheduling parameter.

4. The method of claim 3, wherein upon determining that agent handling is not indicated for the outbound contact request, automatically executing an outbound contact event at the time specified by the scheduling parameter.

5. The method of claim 3, wherein upon determining that agent handling is indicated for the outbound contact request, queuing the outbound contact request for an agent.

6. The method of claim 5, wherein the agent is selected from a group of available agents based on one or more agent parameters, the one or more agent parameters including at least one of an agent skill, a current wait time, or agent authority level.

7. The method of claim 1, wherein for outbound contact requests reserved for delayed push, the outbound contact requests are available for selection by one or more agents.

8. The method of claim 1, wherein the plurality of outbound contact requests are part of a contact campaign.

9. The method of claim 1, wherein contact information corresponding to the plurality of outbound contact requests is retrieved from a data store of potential targets.

10. The method of claim 1, further comprising, after contact events corresponding to the plurality of outbound contact requests are generated, classifying the contact events.

11. The method of claim 1, wherein the plurality of outbound contact requests are received through a single application programming interface (API).

12. A system, comprising:
    a processor; and
    one or more computer-readable storage media storing computer-readable instructions that, when executed by the processor, perform operations comprising:
        receiving a first outbound contact request from an application;
        upon determining that the first outbound contact request is a scheduled request and indicates agent handling, queuing the first outbound contact request for an agent at a time specified in the first outbound contact request;
        receiving a second outbound contact request from the application;
        upon determining that the second outbound contact request is an unscheduled request and does not indicate agent handling, automatically executing an outbound contact event corresponding to the second outbound contact request;
        receiving a third outbound contact request from the application; and
        upon determining that the third outbound contact request is a delayed push request and indicates agent handling, reserving the third outbound contact request until selection by an agent.

13. The system of claim 12, wherein the first outbound contact request has a request type of voice call or chat.

14. The system of claim 12, wherein the second outbound contact request has a request type of text message, voice message, or email, and wherein the outbound contact event is a text message, voice message, or email.

15. The system of claim 14, wherein the second outbound contact request has a request type of email, wherein the outbound contact event is an email with an attachment sent to multiple users, and wherein one instance of the attachment is stored and is associated with the respective email prior to sending.

16. The system of claim 12, wherein the first and second outbound contact requests are received through the same application programming interface (API).

17. One or more computer-readable storage media storing computer-executable instructions for routing outbound contact requests, the routing comprising:
    establishing routing rules for outbound contact requests based on a request type and one or more request parameters, wherein outbound contact requests having different request types can be routed using the routing rules, and wherein the request types include at least three of voice call, voice message, text message, chat, or email;
    through an application programming interface (API), receiving a plurality of outbound contact requests;
    determining that agent handling is indicated for a first subset of the plurality of outbound contact requests and queuing the respective requests in the first subset for an agent;
    determining that a second subset of the plurality of outbound contact requests is unscheduled and automatically executing outbound contact events corresponding to the respective requests in the second subset;
    determining that a third subset of the plurality of outbound contact requests is scheduled and scheduling the respective requests of the third subset for release at times specified in the respective requests; and
    determining that a fourth subset of the plurality of outbound contact requests is delayed push requests and indicate agent handling, and reserving the fourth subset of the plurality of outbound contact requests until selection by an agent.

18. The one or more computer-readable storage media of claim 17, wherein the third subset of the plurality of outbound contact requests includes requests of type email and requests of type text message.

19. The one or more computer-readable storage media of claim 17, wherein the plurality of outbound contact requests are created through interaction between an external application and the API.

* * * * *